United States Patent
Xie

(10) Patent No.: US 10,590,002 B1
(45) Date of Patent: Mar. 17, 2020

(54) METHOD FOR PREPARING MOLECULAR SIEVE SSZ-63

(71) Applicant: Chevron U.S.A. Inc., San Ramon, CA (US)

(72) Inventor: Dan Xie, Richmond, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 16/201,336

(22) Filed: Nov. 27, 2018

(51) Int. Cl.
    *C01B 39/48*     (2006.01)
    *B01J 29/70*     (2006.01)

(52) U.S. Cl.
    CPC ........... *C01B 39/48* (2013.01); *B01J 29/7007* (2013.01); *C01P 2002/72* (2013.01); *C01P 2004/03* (2013.01)

(58) Field of Classification Search
    CPC .............................. C01B 39/48; B01J 29/7007
    See application file for complete search history.

(56) References Cited

U.S. PATENT DOCUMENTS

| | | | |
|---|---|---|---|
| 6,464,956 B1 * | 10/2002 | Elomari | B01D 53/8628 423/706 |
| 6,733,742 B1 | 5/2004 | Elomari | |
| 6,776,973 B2 | 8/2004 | Elomari | |
| 6,827,843 B2 | 12/2004 | Elomari | |
| 9,822,012 B2 | 11/2017 | Elomari | |
| 9,878,916 B2 | 1/2018 | Elomari | |

OTHER PUBLICATIONS

J.B. Higgins, R.B. Lapierre, J.L. Schlenker, A.C. Rohrman, J.D. Wood, G.T. Kerr and W.J. Rohrbaugh "The framework topology of zeolite beta" Zeolites 1988, 8, 446-452.
J.B. Higgins, R.B. Lapierre, J.L. Schlenker, A.C. Rohrman, J.D. Wood, G.T. Kerr and W.J. Rohrbaugh "The Framework Topology of Zeolite Beta—A Correction" Zeolites 1989, 9, 358.
A.W. Burton, S. Elomari, I. Chan, A. Pradhan and C. Kibby "Structure and Synthesis of SSZ-63: Toward an Ordered Form of Zeolite Beta" J. Phys. Chem. B 2005, 109, 20266-20275.

* cited by examiner

*Primary Examiner* — David M Brunsman
(74) *Attorney, Agent, or Firm* — Terrence M. Flaherty

(57) ABSTRACT

A method is provided for synthesizing a molecular sieve having the framework structure of SSZ-63 using di(cyclopentylmethyl)dimethylammonium cations as a structure directing agent.

7 Claims, 4 Drawing Sheets

METHOD FOR PREPARING MOLECULAR SIEVE SSZ-63

FIELD

This disclosure relates to the synthesis of molecular sieve SSZ-63 and its use in sorptive and catalytic processes.

BACKGROUND

Zeolitic materials are known to have utility as sorbents and to have catalytic properties for various types of organic conversion reactions. Certain zeolitic materials are ordered, porous crystalline materials having a definite crystalline structure as determined by X-ray diffraction. Within the zeolitic crystalline material there are a large number of cavities which may be interconnected by a number of smaller channels or pores. These cavities and pores are uniform in size within a specific zeolitic material. Since the dimensions of these pores are such as to accept for sorption molecules of certain dimensions while rejecting those of larger dimensions, these materials have come to be known as "molecular sieves" and are utilized in a variety of ways to take advantage of these properties.

The composition and characterizing powder X-ray diffraction pattern of molecular sieve SSZ-63 are disclosed in U.S. Pat. No. 6,733,742, which also describes the synthesis of the molecular sieve using N-cyclodecyl-N-methylpyrrolidinium cations as a structure directing agent.

According to A. W. Burton et al. (*J. Phys. Chem. B* 2005, 109, 20266-20275), SSZ-63 is related structurally to zeolite beta. Zeolite beta possesses a three-dimensional system of pores delimited by 12-ring windows. Whereas conventional zeolite beta may be described as a random intergrowth of two polytypes, polytype A and polytype B, in nearly equal proportions, SSZ-63 may be described as a random intergrowth of beta polytypes B and $C_H$ having about 60-70% polytype $C_H$ character. Polytype $C_H$ is the hypothetical polytype C proposed by J. B. Higgins et al. (*Zeolites* 1988, 8, 446-452 and *Zeolites* 1989, 9, 358) and is essentially an ordered intergrowth of polytypes A and B.

U.S. Pat. No. 9,878,916 discloses the synthesis of SSZ-63 using 1-(decahydronaphthalene-2-yl)-1-methylpyrrolidinium cations as a structure directing agent.

According to the present disclosure, it has now been found that di(cyclopentylmethyl)dimethylammonium cations can be effective as a structure directing agent in the synthesis of SSZ-63.

SUMMARY

In one aspect, there is provided a method of synthesizing a molecular sieve having the structure of SSZ-63, the method comprising (a) providing a reaction mixture comprising: (1) a source of silicon oxide; (2) a source of aluminum oxide; (3) a source of a Group 1 or Group 2 metal (M); (4) a structure directing agent (Q) comprising di(cyclopentylmethyl)dimethylammonium cations; (5) a source of hydroxide ions; and (6) water; and (b) subjecting the reaction mixture to crystallization conditions sufficient to form crystals of the molecular sieve.

In another aspect, there is provided a molecular sieve having the structure of SSZ-63 and, in its as-synthesized form, comprising di(cyclopentylmethyl)dimethylammonium cations in its pores.

DETAILED DESCRIPTION

Introduction

Figure 1:
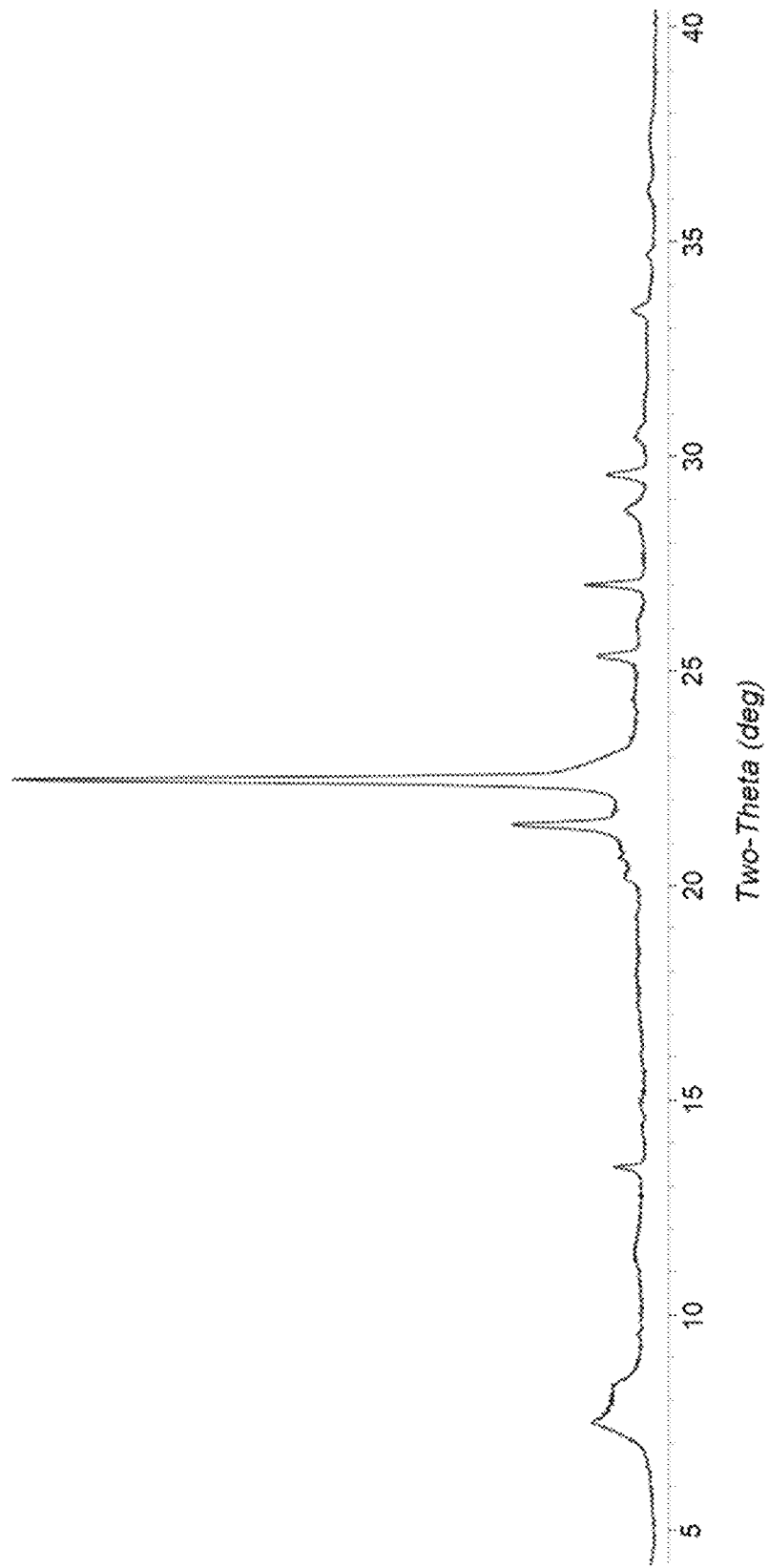
FIG. 1 shows the powder X-ray diffraction (XRD) pattern of the as-synthesized product of Example 1.

The term "as-synthesized" is employed herein to refer to a molecular sieve in its form after crystallization, prior to removal of the structure directing agent.

The term "anhydrous" is employed herein to refer to a molecular sieve substantially devoid of both physically adsorbed and chemically adsorbed water.

As used herein, the numbering scheme for the Periodic Table Groups is as disclosed in *Chem. Eng. News* 1985, 63(5), 26-27.

Reaction Mixture

In general, a molecular sieve having the framework structure of SSZ-63 may be synthesized by: (a) providing a reaction mixture comprising (1) a source of silicon oxide; (2) a source of aluminum oxide; (3) a source of a Group 1 or Group 2 metal (M); (4) a structure directing agent (Q) comprising di(cyclopentylmethyl)dimethylammonium cations; (5) a source of hydroxide ions; and (6) water; and (b) subjecting the reaction mixture to crystallization conditions sufficient to form crystals of the molecular sieve.

The composition of the reaction mixture from which the molecular sieve may be formed, in terms of molar ratios, is identified in Table 1 below:

TABLE 1

| Reactants | Broad | Exemplary |
|---|---|---|
| $SiO_2/Al_2O_3$ | 10 to 200 | 15 to 100 |
| $M/SiO_2$ | 0.05 to 0.40 | 0.10 to 0.30 |
| $Q/SiO_2$ | 0.05 to 0.50 | 0.05 to 0.30 |
| $OH/SiO_2$ | 0.10 to 0.50 | 0.15 to 0.40 |
| $H_2O/SiO_2$ | 5 to 80 | 15 to 60 |

Suitable sources of silicon oxide include colloidal silica, fumed silica, precipitated silica, alkali metal silicates and tetraalkyl orthosilicates.

Suitable sources of aluminum oxide include hydrated alumina and water-soluble aluminum salts (e.g., aluminum nitrate).

Combined sources of silicon oxide and aluminum oxide can additionally or alternatively be used and can include aluminosilicate zeolites (e.g., zeolite Y) and clays or treated clays (e.g., metakaolin).

Examples of suitable Group 1 or Group 2 metals (M) include sodium, potassium, and calcium. The metal is generally present in the reaction mixture as the hydroxide.

The organic structure directing agent (Q) comprises di(cyclopentylmethyl)dimethylammonium cations, represented by the following structure (1):

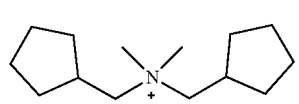

(1)

Suitable sources of Q are the hydroxides and/or other salts of the quaternary ammonium compound.

The reaction mixture may contain seeds of a molecular sieve material, such as SSZ-63 from a previous synthesis, in an amount of from 0.01 to 10,000 ppm by weight (e.g., 100 to 5000 ppm by weight) of the reaction mixture. Seeding can be advantageous in decreasing the amount of time necessary for complete crystallization to occur. In addition, seeding can lead to an increased purity of the product obtained by promoting the nucleation and/or formation of SSZ-63 over any undesired phases.

For each embodiment described herein, the molecular sieve reaction mixture can be supplied by more than one source. Also, two or more reaction components can be provided by one source.

The reaction mixture can be prepared either batch wise or continuously. Crystal size, morphology and crystallization time of the molecular sieve described herein can vary with the nature of the reaction mixture and the crystallization conditions.

Crystallization and Post-Synthesis Treatment

Crystallization of the molecular sieve from the above reaction mixture can be carried out under either static, tumbled or stirred conditions in a suitable reactor vessel, such as polypropylene jars or Teflon-lined or stainless steel autoclaves, at a temperature of from 125° C. to 200° C. for a time sufficient for crystallization to occur at the temperature used, e.g., from 50 to 500 hours. Crystallization is usually conducted in an autoclave so that the reaction mixture is subject to autogenous pressure.

Once the molecular sieve crystals have formed, the solid product is recovered from the reaction mixture by standard mechanical separation techniques such as centrifugation or filtration. The crystals are water-washed and then dried to obtain the as-synthesized molecular sieve crystals. The drying step is typically performed at a temperature of less than 200° C.

As a result of the crystallization process, the recovered crystalline molecular sieve product contains within its pore structure at least a portion of the structure directing agent used in the synthesis.

To the extent desired, any cations in the as-synthesized molecular sieve can be replaced in accordance with techniques well known in the art by ion exchange with other cations. Preferred replacing cations include metal ions, hydrogen ions, hydrogen precursor (e.g., ammonium) ions and mixtures thereof. Particularly preferred replacing cations are those which tailor the catalytic activity for certain organic conversion reactions. These include hydrogen, rare earth metals and metals of Groups 2 to 15 of the Periodic Table of the Elements.

The molecular sieve described herein may be subjected to subsequent treatment to remove part or all of the structure directing agent used in its synthesis. This can be conveniently effected by thermal treatment in which the as-synthesized material can be heated at a temperature of at least 370° C. for at least 1 minute and not longer than 24 hours. The thermal treatment can be performed at a temperature up to 925° C. While sub-atmospheric and/or super-atmospheric pressures can be employed for the thermal treatment, atmospheric pressure may typically be desired for reasons of convenience. Additionally or alternatively, the structure directing agent can be removed by treatment with ozone (see, e.g., A. N. Parikh et al., *Micropor. Mesopor. Mater.* 2004, 76, 17-22).

Characterization of the Molecular Sieve

In its as-synthesized and anhydrous form, the present molecular sieve may have a chemical composition comprising the following molar relationship as described in Table 2:

TABLE 2

|  | Broad | Exemplary |
|---|---|---|
| $SiO_2/Al_2O_3$ | 10 to 200 | 15 to 100 |
| $Q/SiO_2$ | >0 to 0.2 | >0 to 0.1 |
| $M/SiO_2$ | >0 to 0.2 | >0 to 0.1 | wherein compositional variables Q and M are as described herein above.

It should be noted that the as-synthesized form of the present molecular sieve may have molar ratios different from the molar ratios of reactants of the reaction mixture used to prepare the as-synthesized form. This result may occur due to incomplete incorporation of 100% of the reactants of the reaction mixture into the crystals formed (from the reaction mixture).

As taught by U.S. Pat. No. 6,733,742, molecular sieve SSZ-63 has a powder X-ray diffraction pattern which, in its as-synthesized form, includes at least the peaks set forth in Table 3 below and which, in its calcined form, includes at least the peaks set forth in Table 4.

TABLE 3

Characteristic Peaks for As-Synthesized SSZ-63

| 2-Theta[a] | d-Spacing (nm) | Relative Intensity[b] |
|---|---|---|
| 7.17 | 1.232 | W |
| 7.46 | 1.184 | W |
| 7.86 | 1.124 | W |
| 8.32 | 1.062 | W |
| 21.42 | 0.415 | M |
| 22.46 | 0.396 | VS |
| 22.85 | 0.389 | W |
| 25.38 | 0.351 | W |
| 27.08 | 0.329 | W |
| 29.62 | 0.301 | W |

[a] ±0.2
[b] The powder XRD patterns provided are based on a relative intensity scale in which the strongest line in the XRD pattern is assigned a value of 100: W = weak (>0 to ≤20); M = medium (>20 to ≤40); S = strong (>40 to ≤60); VS = very strong (>60 to ≤100).

TABLE 4

Characteristic Peaks for Calcined SSZ-63

| 2-Theta[a] | d-Spacing (nm) | Relative Intensity[b] |
|---|---|---|
| 7.19 | 1.229 | M |
| 7.42 | 1.191 | VS |
| 7.82 | 1.130 | VS |
| 8.30 | 1.064 | M |
| 13.40 | 0.660 | M |
| 21.46 | 0.414 | W |
| 22.50 | 0.395 | VS |
| 22.81 | 0.390 | W |
| 27.14 | 0.328 | M |
| 29.70 | 0.306 | W |

[a] ±0.2
[b] The powder XRD patterns provided are based on a relative intensity scale in which the strongest line in the XRD pattern is assigned a value of 100: W = weak (>0 to ≤20); M = medium (>20 to ≤40); S = strong (>40 to ≤60); VS = very strong (>60 to ≤100).

The powder X-ray diffraction patterns presented herein were collected by standard techniques. The radiation was CuKα radiation. The peak heights and the positions, as a function of 2θ where θ is the Bragg angle, were read from the relative intensities of the peaks (adjusting for background), and d, the interplanar spacing corresponding to the recorded lines, can be calculated.

Minor variations in the diffraction pattern can result from variations in the mole ratios of the framework species of the sample due to changes in lattice constants. In addition, disordered materials and/or sufficiently small crystals will affect the shape and intensity of peaks, leading to significant peak broadening. Minor variations in the diffraction pattern can also result from variations in the organic compound used in the preparation. Calcination can also cause minor shifts in the XRD pattern. Notwithstanding these minor perturbations, the basic crystal lattice structure remains unchanged.

Sorption and Catalysis

The crystalline molecular sieve prepared according to the method described herein may be used as a sorbent or as a catalyst to catalyze a wide variety of organic conversion processes including many of present commercial/industrial importance. Examples of chemical conversion processes which are effectively catalyzed by SSZ-63, by itself or in combination with one or more other catalytically active substances including other crystalline catalysts, include those requiring a catalyst with acid activity. Examples of organic conversion processes which may be catalyzed by SSZ-63 can include alkylation, cracking, hydrocracking, disproportionation, oligomerization, and isomerization.

SSZ-63, prepared according to the method described herein, may be used as a hydrocarbon trap (e.g., pre-catalytic converter adsorbent) for cold start emissions in motor vehicles.

As in the case of many catalysts, it may be desirable to incorporate SSZ-63 with another material resistant to the temperatures and other conditions employed in organic conversion processes. Such materials can include active and inactive materials and synthetic or naturally occurring zeolites as well as inorganic materials such as clays, silica and/or metal oxides such as alumina. The latter may be either naturally occurring, or in the form of gelatinous precipitates or gels, including mixtures of silica and metal oxides. Use of a material in conjunction with SSZ-63 (i.e., combined therewith or present during synthesis of the new material) which is active, tends to change the conversion and/or selectivity of the catalyst in certain organic conversion processes. Inactive materials can suitably serve as diluents to control the amount of conversion in a given process so that products can be obtained in an economic and orderly manner without employing other means for controlling the rate of reaction. These materials may be incorporated into naturally occurring clays (e.g., bentonite and kaolin) to improve the crush strength of the catalyst under commercial operating conditions. These materials (i.e., clays, oxides, etc.) can function as binders for the catalyst. It can be desirable to provide a catalyst having good crush strength because in commercial use it can be desirable to prevent the catalyst from breaking down into powder-like materials. These clay and/or oxide binders have been employed normally only for the purpose of improving the crush strength of the catalyst.

Naturally occurring clays which can be composited with SSZ-63 can include the montmorillonite and kaolin family, which families include the sub-bentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with SSZ-63 can additionally or alternatively include inorganic oxides, such as silica, zirconia, titania, magnesia, beryllia, alumina, and mixtures thereof.

In addition to the foregoing materials, SSZ-63 can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia silica-alumina-magnesia and silica-magnesia-zirconia.

The relative proportions of SSZ-63 and inorganic oxide matrix may vary widely, with the SSZ-63 content ranging from 1 to 90 wt. % (e.g., 2 to 80 wt. %) of the composite. An exemplary matrix content can range from 10 to 50 wt. % of the composite.

EXAMPLES

The following illustrative examples are intended to be non-limiting.

Example 1

1.21 g of deionized water, 0.26 g of an aqueous 50% NaOH solution, 1.34 g of a 27.24% di(cyclopentylmethyl)dimethylammonium hydroxide solution and 1.00 g of CBV720 Y-zeolite powder (Zeolyst International, $SiO_2/Al_2O_3$ molar ratio=30) were mixed together in a Teflon liner. The resulting gel was stirred until it became homogeneous. The liner was then capped and placed within a Parr steel autoclave reactor. The autoclave was then placed in an oven and the heated at 160° C. for 6 days under static conditions. The solid products were recovered by centrifugation, washed with deionized water and dried at 95° C.

Figure 2:
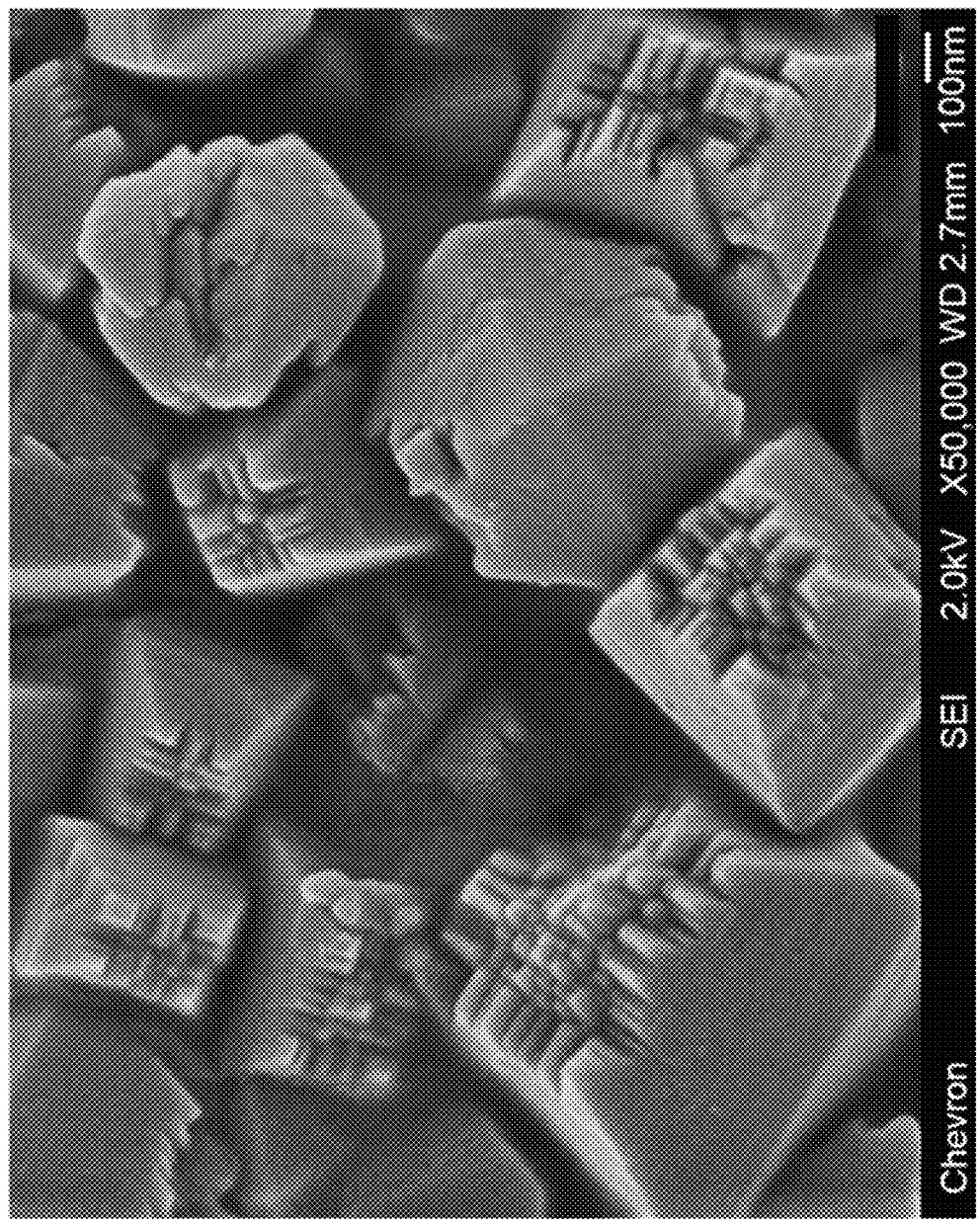
FIG. 2 shows a Scanning Electron Micrograph (SEM) image of the as-synthesized product of Example 1.

The powder XRD pattern of the as-synthesized product is shown in FIG. 1 and is consistent with the product being SSZ-63. A SEM image of the as-synthesized product is shown in FIG. 2 indicating a uniform field of crystals.

The product had a $SiO_2/Al_2O_3$ molar ratio of 26.1, as determined by ICP elemental analysis.

Example 2

18.44 g of deionized water, 0.77 g of an aqueous 50% NaOH solution, 4.03 g of a 27.24% di(cyclopentylmethyl)dimethylammonium hydroxide solution and 3.00 g of CBV720 Y-zeolite powder (Zeolyst International, $SiO_2/Al_2O_3$ molar ratio=30) were mixed together in a Teflon liner. The resulting gel was stirred until it became homogeneous. The liner was then capped and placed within a Parr steel autoclave reactor. The autoclave was then placed in an oven and the heated at 160° C. for 9 days under static conditions. The solid products were recovered by centrifugation, washed with deionized water and dried at 95° C.

Powder XRD showed the product to be pure SSZ-63.

The product had a $SiO_2/Al_2O_3$ molar ratio of 24.7, as determined by ICP elemental analysis.

Example 3

2.43 g of deionized water, 0.51 g of an aqueous 50% NaOH solution, 2.69 g of a 27.24% di(cyclopentylmethyl)dimethylammonium hydroxide solution, and 2.00 of CBV760 Y-zeolite (Zeolyst International, $SiO_2/Al_2O_3$ molar ratio=60) were mixed together in a Teflon liner. The resulting gel was stirred until it became homogeneous. The liner was then capped and placed within a Parr steel autoclave reactor. The autoclave was then placed in an oven and the heated at 160° C. for 6 days under static conditions. The solid products were recovered by centrifugation, washed with deionized water and dried at 95° C.

Figure 3:
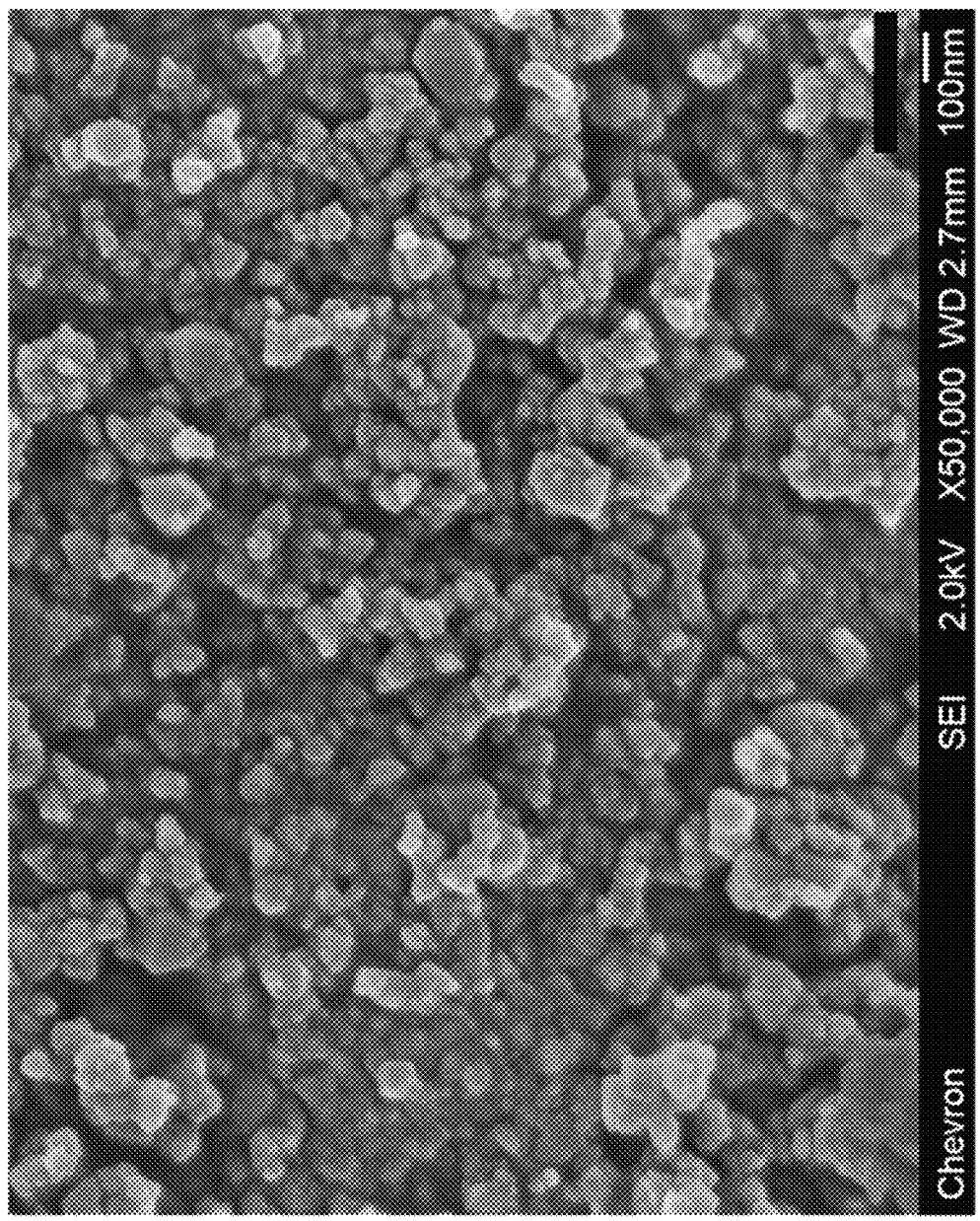
FIG. 3 shows a SEM image of the as-synthesized molecular sieve product of Example 3.

Powder XRD showed the product to be pure SSZ-63. A SEM image of the product is shown in FIG. 3. The crystal sizes of the product are much smaller in comparison to the crystal sizes of the product of Example 1.

The product had a $SiO_2/Al_2O_3$ molar ratio of 36.0, as determined by ICP elemental analysis.

Example 4

5.08 g of deionized water, 0.40 g of an aqueous 45% KOH solution, 2.69 g of a 27.24% di(cyclopentylmethyl)dimethylammonium hydroxide solution, and 1.00 g of CBV760 Y-zeolite (Zeolyst International, $SiO_2/Al_2O_3$ molar ratio=60) were mixed together in a Teflon liner. The resulting gel was stirred until it became homogeneous. The liner was then capped and placed within a Parr steel autoclave reactor. The autoclave was then placed in an oven and the heated at 160° C. for 8 days under static conditions. The solid products were recovered by centrifugation, washed with deionized water and dried at 95° C.

Powder XRD showed the product to be pure SSZ-63.

The product had a $SiO_2/Al_2O_3$ molar ratio of 37.7, as determined by ICP elemental analysis.

Example 5

4.25 g of deionized water, 0.25 g of an aqueous 45% KOH solution, 0.83 g of a 27.24% di(cyclopentylmethyl)dimethylammonium hydroxide solution, 0.08 g of hydrated alumina (Reheis F-2000), and 2.00 g of colloidal silica (LUDOX© AS-30) were mixed together in a Teflon liner. The resulting gel was stirred until it became homogeneous. The liner was then capped and placed within a Parr steel autoclave reactor. The autoclave was then placed in an oven and the heated at 160° C. for 7 days with tumbling at 43 rpm. The solid products were recovered by centrifugation, washed with deionized water and dried at 95° C.

Powder XRD showed the product to be pure SSZ-63.

The product had a $SiO_2/Al_2O_3$ molar ratio of 24.6, as determined by ICP elemental analysis.

Example 6

6.40 g of deionized water, 0.37 g of an aqueous 45% KOH solution, 1.25 g of a 27.24% di(cyclopentylmethyl)dimethylammonium hydroxide solution, 0.06 g of hydrated alumina (Reheis F-2000), and 3.00 g of colloidal silica (LUDOX© AS-30) were mixed together in a Teflon liner. The resulting gel was stirred until it became homogeneous. The liner was then capped and placed within a Parr steel autoclave reactor. The autoclave was then placed in an oven and the heated at 160° C. for 7 days with tumbling at 43 rpm. The solid products were recovered by centrifugation, washed with deionized water and dried at 95° C.

Powder XRD showed the product to be pure SSZ-63.

The product had a $SiO_2/Al_2O_3$ molar ratio of 48.8, as determined by ICP elemental analysis.

Example 7

The as-synthesized molecular sieve of Example 1 was calcined inside a muffle furnace under a flow of air heated to 540° C. at a rate of 1° C./minute and held at 540° C. for 5 hours, cooled and then analyzed by powder XRD.

Figure 4:
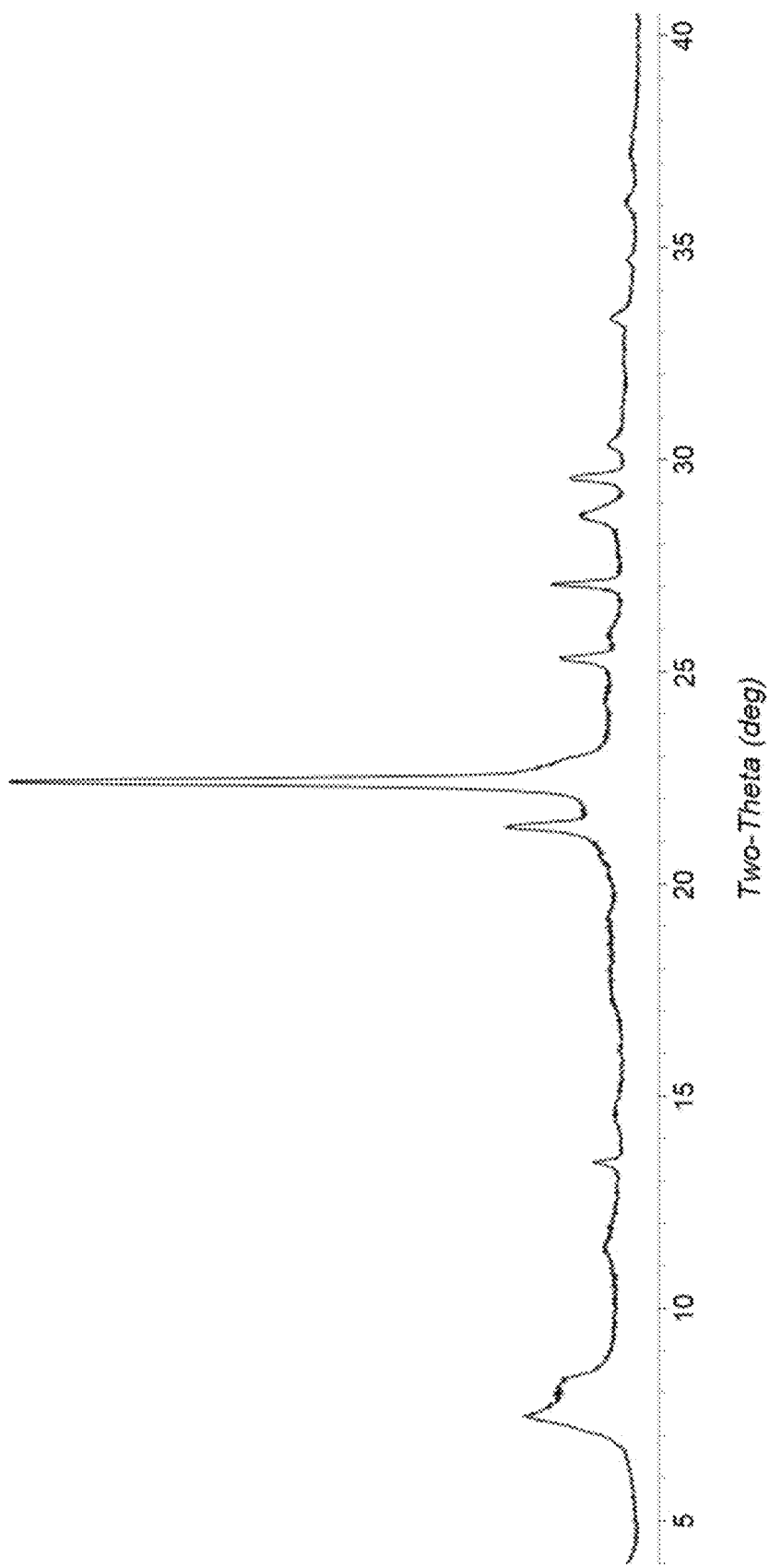
FIG. 4 shows the powder XRD pattern of the calcined product of Example 7.

Powder XRD of the calcined product gave the pattern indicated in FIG. 4 and showed the material to be stable after calcination to remove the structure directing agent.

The calcined molecular sieve was subjected to a micropore volume analysis using argon an adsorbate and via the Density Function Theory method. The calcined molecular sieve exhibited a micropore volume of 0.23 $cm^3/g$.

The invention claimed is:

1. A method of synthesizing a molecular sieve having the structure of SSZ-63, the method comprising:
    (a) providing a reaction mixture comprising:
        (1) a source of silicon oxide;
        (2) a source of aluminum oxide;
        (3) a source of a Group 1 or Group 2 metal (M);
        (4) a structure directing agent (Q) comprising di(cyclopentylmethyl)dimethylammonium cations;
        (5) a source of hydroxide ions; and
        (6) water; and
    (b) subjecting the reaction mixture to crystallization conditions sufficient to form crystals of the molecular sieve.

2. The method of claim 1, wherein the reaction mixture has a composition, in terms of molar ratios, as follows:

| | |
|---|---|
| $SiO_2/Al_2O_3$ | 10 to 200 |
| $M/SiO_2$ | 0.05 to 0.40 |
| $Q/SiO_2$ | 0.05 to 0.50 |
| $OH/SiO_2$ | 0.10 to 0.50 |
| $H_2O/SiO_2$ | 5 to 80. |

3. The method of claim 1, wherein the reaction mixture has a composition, in terms of molar ratios, as follows:

| | |
|---|---|
| $SiO_2/Al_2O_3$ | 15 to 100 |
| $M/SiO_2$ | 0.10 to 0.30 |
| $Q/SiO_2$ | 0.05 to 0.30 |
| $OH/SiO_2$ | 0.15 to 0.40 |
| $H_2O/SiO_2$ | 15 to 60. |

4. The method of claim 1, wherein the crystallization conditions include a temperature of from 125° C. to 200° C.

5. A molecular sieve having the structure of SSZ-63 and, in its as-synthesized form, comprising di(cyclopentylmethyl)dimethylammonium cations in its pores.

6. The molecular sieve of claim 5 and having a molar ratio of $SiO_2/Al_2O_3$ in a range of 10 to 200.

7. The molecular sieve of claim 5 and having a molar ratio of $SiO_2/Al_2O_3$ in a range of 15 to 100.

\* \* \* \* \*